April 29, 1958 E. L. ECKFELDT 2,832,734

COULOMETRIC SYSTEMS

Filed Feb. 14, 1952 8 Sheets-Sheet 1

Fig. I

*INVENTOR.*
EDGAR L. ECKFELDT

*BY*
Woolcock and Phelan
ATTORNEYS

April 29, 1958 E. L. ECKFELDT 2,832,734

COULOMETRIC SYSTEMS

Filed Feb. 14, 1952 8 Sheets-Sheet 2

*INVENTOR.*
EDGAR L. ECKFELDT
*BY*
Woodcock and Phelan
ATTORNEYS

April 29, 1958 E. L. ECKFELDT 2,832,734

COULOMETRIC SYSTEMS

Filed Feb. 14, 1952 8 Sheets-Sheet 3

INVENTOR.
EDGAR L. ECKFELDT
BY
Woodcock and Phelan
ATTORNEYS

April 29, 1958 E. L. ECKFELDT 2,832,734

COULOMETRIC SYSTEMS

Filed Feb. 14, 1952 8 Sheets-Sheet 4

INVENTOR.
EDGAR L. ECKFELDT
BY
Woodcock and Phelan
ATTORNEYS

April 29, 1958 E. L. ECKFELDT 2,832,734

COULOMETRIC SYSTEMS

Filed Feb. 14, 1952 8 Sheets-Sheet 5

INVENTOR.
EDGAR L. ECKFELDT
BY
Woodcock and Phelan
ATTORNEYS

INVENTOR.
EDGAR L. ECKFELDT
BY
Woodcock and Phelan
ATTORNEYS

April 29, 1958 E. L. ECKFELDT 2,832,734

COULOMETRIC SYSTEMS

Filed Feb. 14, 1952 8 Sheets-Sheet 7

INVENTOR.
EDGAR L. ECKFELDT

BY

Woodcock and Phelan

ATTORNEYS

April 29, 1958 E. L. ECKFELDT 2,832,734

COULOMETRIC SYSTEMS

Filed Feb. 14, 1952 8 Sheets-Sheet 8

INVENTOR.
EDGAR L. ECKFELDT

BY

Woodcock and Phelan

ATTORNEYS

United States Patent Office 2,832,734

Patented Apr. 29, 1958

2,832,734

COULOMETRIC SYSTEMS

Edgar L. Eckfeldt, Ambler, Pa., assignor to Leeds and Northrup Company, Philadelphia, Pa., a corporation of Pennsylvania Application February 14, 1952, Serial No. 271,537

16 Claims. (Cl. 204—195)

This invention relates to methods and apparatus for determining the amount of a substance present or for establishing the concentration of a substance or constituent in a fluid and has for an object the provision of a system in which the amount or concentration of the constituent may be determined or established directly from an indicator and without the need of employing complicated measuring equipment, such as coulometers and the like.

The present application is a continuation-in-part of my earlier filed application Serial No. 564,536, filed November 21, 1944, now Patent No. 2,621,671. In that application there are set forth numerous examples of determinations of concentrations of constituents in solutions by passage of an electric current through a solution electrolytically to change the compositional characteristic of the solution to bring a constituent therein to an end-point for determination of its concentration in terms of the measurement of the amount of electricity required. In my said application it is disclosed that by maintaining the electrolyzing current constant and measuring the time of application to the solution, the amount of reagent produced or the extent of chemical reaction may be readily determined by measuring the time of current flow.

The present invention is particularly directed to the constant current system and to the regulation or control of the current to maintain it at a selected value, notwithstanding wide changes in the system parameters, such as change in the resistance of the electrolyte where the titrating agent is generated, and notwithstanding changes in voltage, resistance, or other parameters of the coulometric system which tend to vary the current flow between the electrodes.

In the preferred form of the invention the desired value of current to be maintained between the electrodes is established by a potential difference across a resistor whose resistance value is established with great accuracy so that the potential difference developed across it by flow through it of a desired value of current is precisely that of a standard cell, or a predetermined fraction thereof. Any change from the desired value of current flow through the resistor produces an error voltage (the difference between the potential drop across the resistor and that of the standard cell), which error voltage is amplified and applied to a regulator of the source of current in a direction to prevent deviation from the selected value by more than a small or an infinitesimal amount. More specifically, the error voltage is converted to alternating current, its amplitude increased by an alternating-current amplifier, reconverted to direct current, and a bias voltage developed therefrom for regulating the current flow through an electronic device connected in series relation with the electrodes. In this manner there is avoided the need for the use of a coulometer capable of recording the amount of electricity with variable current flow in the electrode circuit.

Accordingly, there is provided by the present invention a constant speed indicating device calibrated in terms of quantity or of concentration of a constituent in a solution in a treating zone. The difference between an initial reading, that when current flow through the electrodes is initiated, and the reading upon arrival of the constituent in the solution at an end-point, is a direct measure of the amount or concentration of the constituent in the solution. When the initial reading is zero, the final reading will be the amount or concentration of the constituent.

For other objects and advantages of the invention and for other modifications thereof reference is now to be had to the following detailed description taken in conjunction with the accompanying drawings, in which:

Fig. 1, more or less in block diagram form, diagrammatically illustrates one form of the invention;

Figure 5:
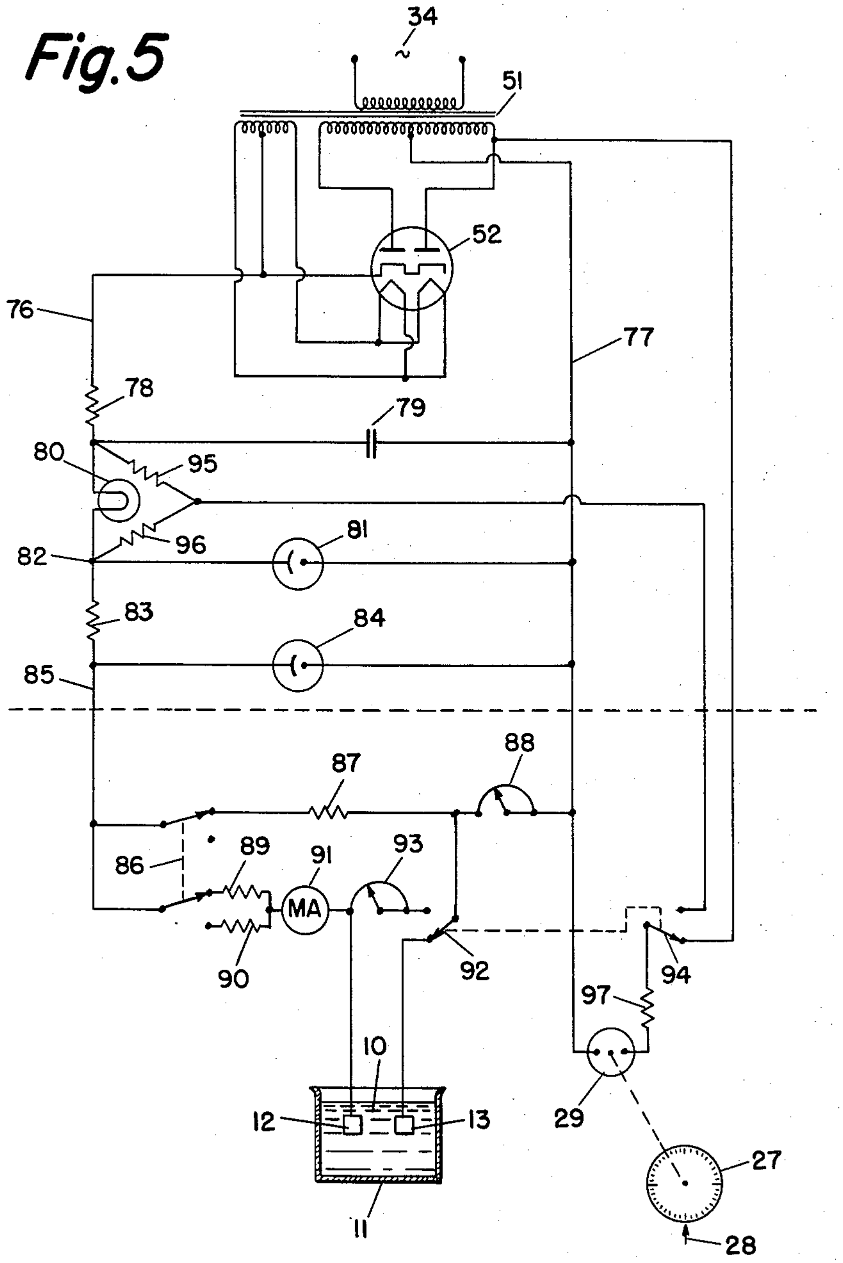
Figure 6:
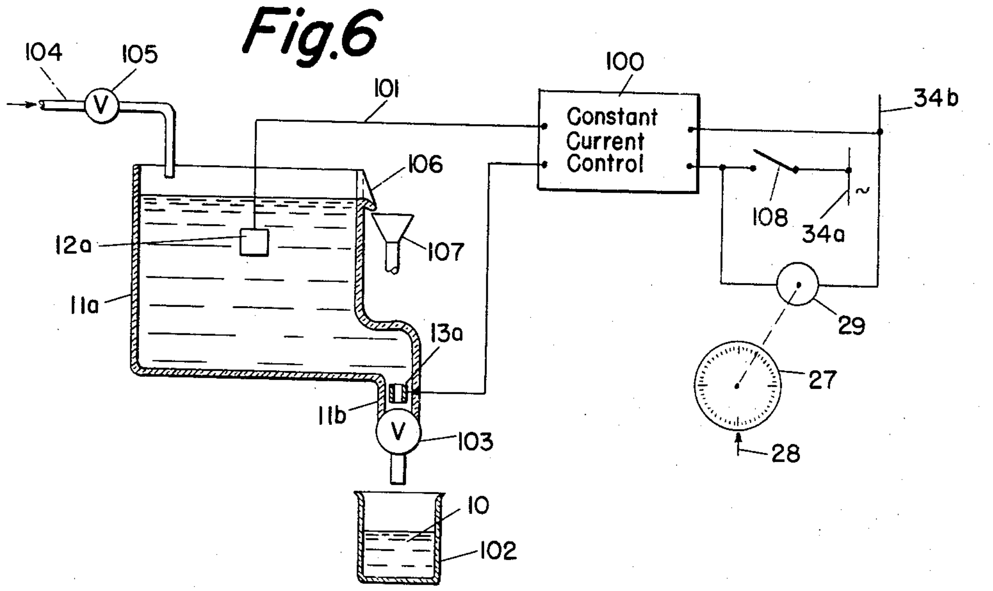
Figures 7, 8:
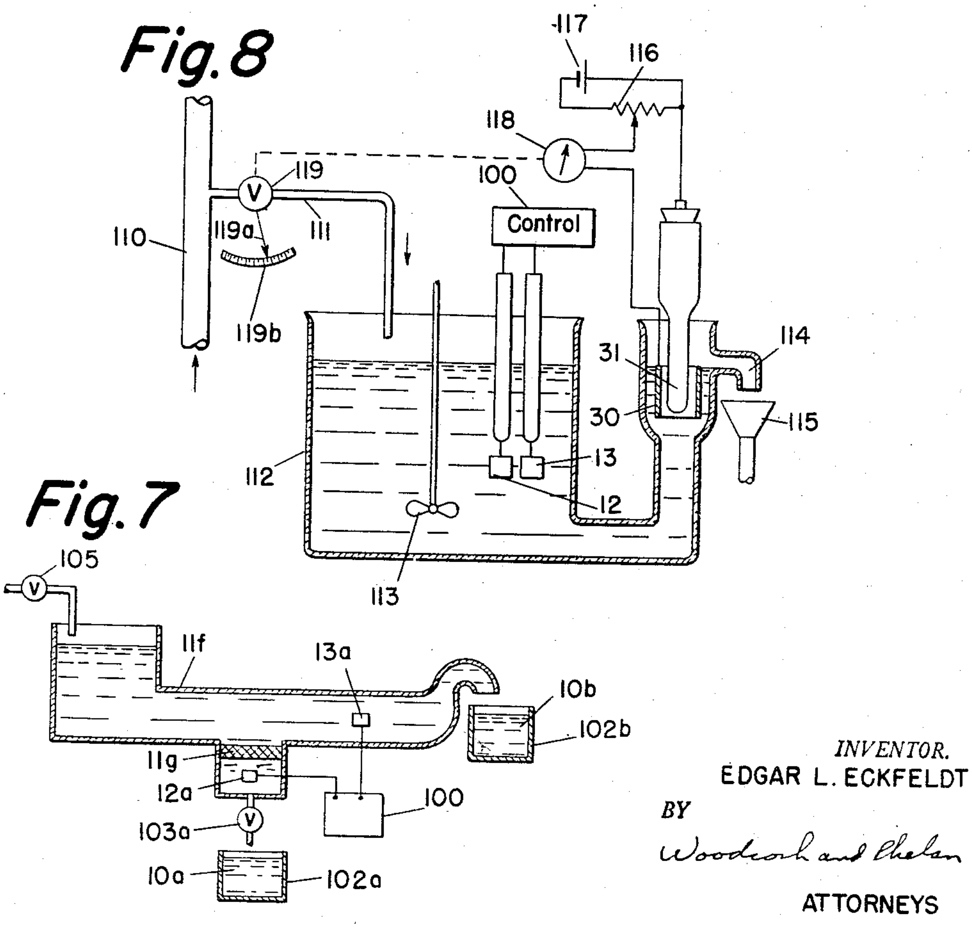
Figure 9:
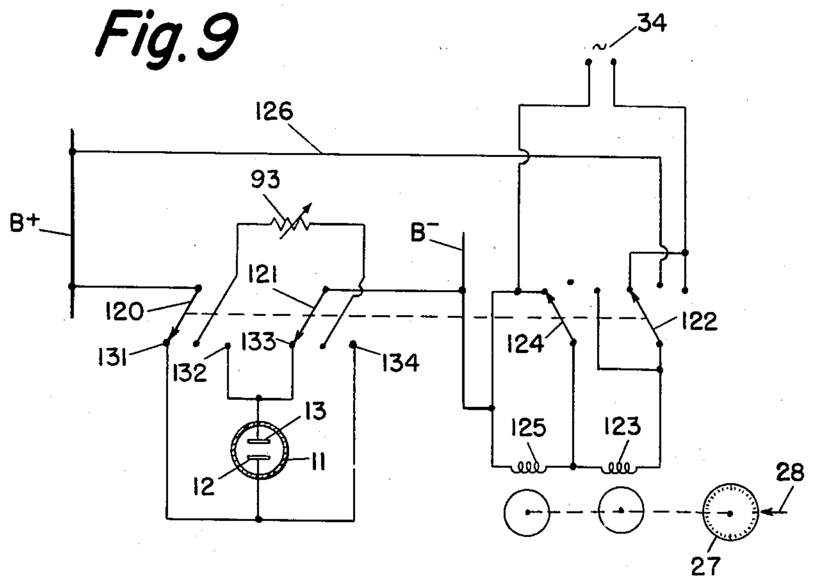
Figure 10:
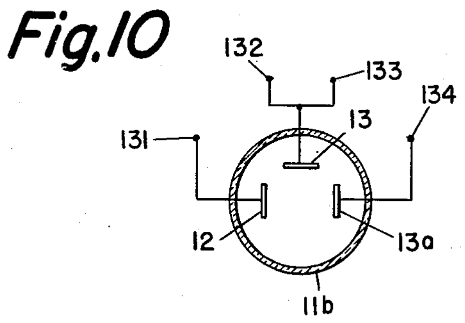
Figure 11:
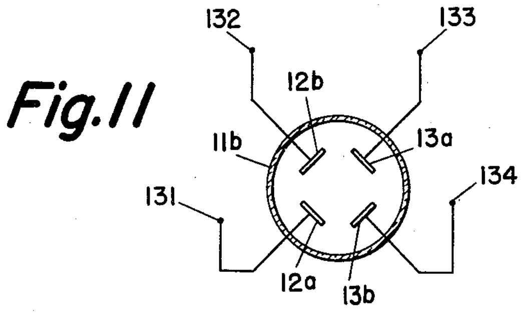
Figure 12:
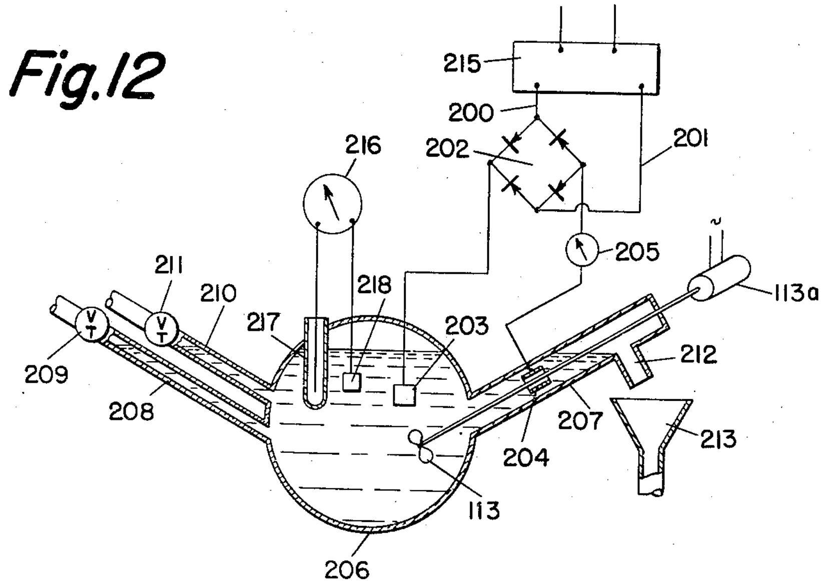
Figure 13:
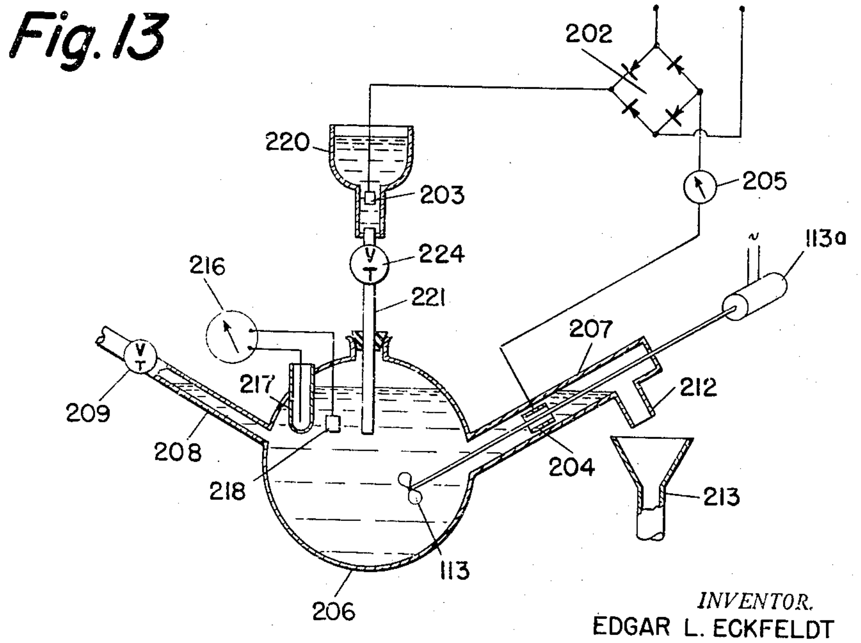
Figure 14:
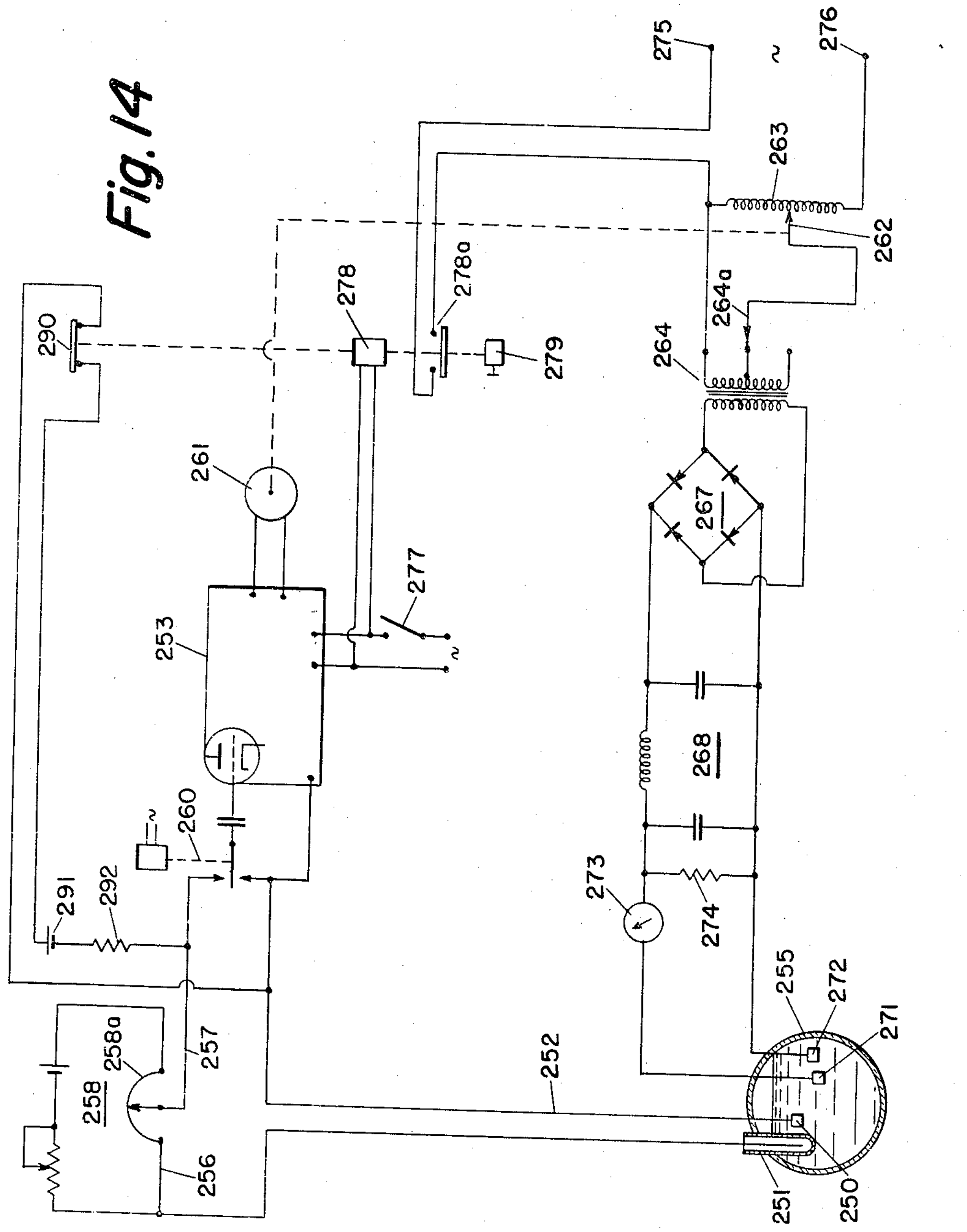

Fig. 5 diagrammatically illustrates a further modification of the invention;

Fig. 6 diagrammatically illustrates a further variation of apparatus to which the invention is applied;

Figs. 7 and 8 diagrammatically illustrate continuous or batch systems to which the invention has been applied;

Figs. 9, 10 and 11 diagrammatically illustrate different electrode arrangements with suitable switching means therefor and which may be utilized in connection with several of the preceding figures;

Figs. 12 and 13 diagrammatically illustrate further modifications of the invention as applied to continuously operated systems; and Fig. 14 diagrammatically illustrates a control system of a somewhat different type applicable to other embodiments of the invention and including Figs. 9–13.

Figure 1:
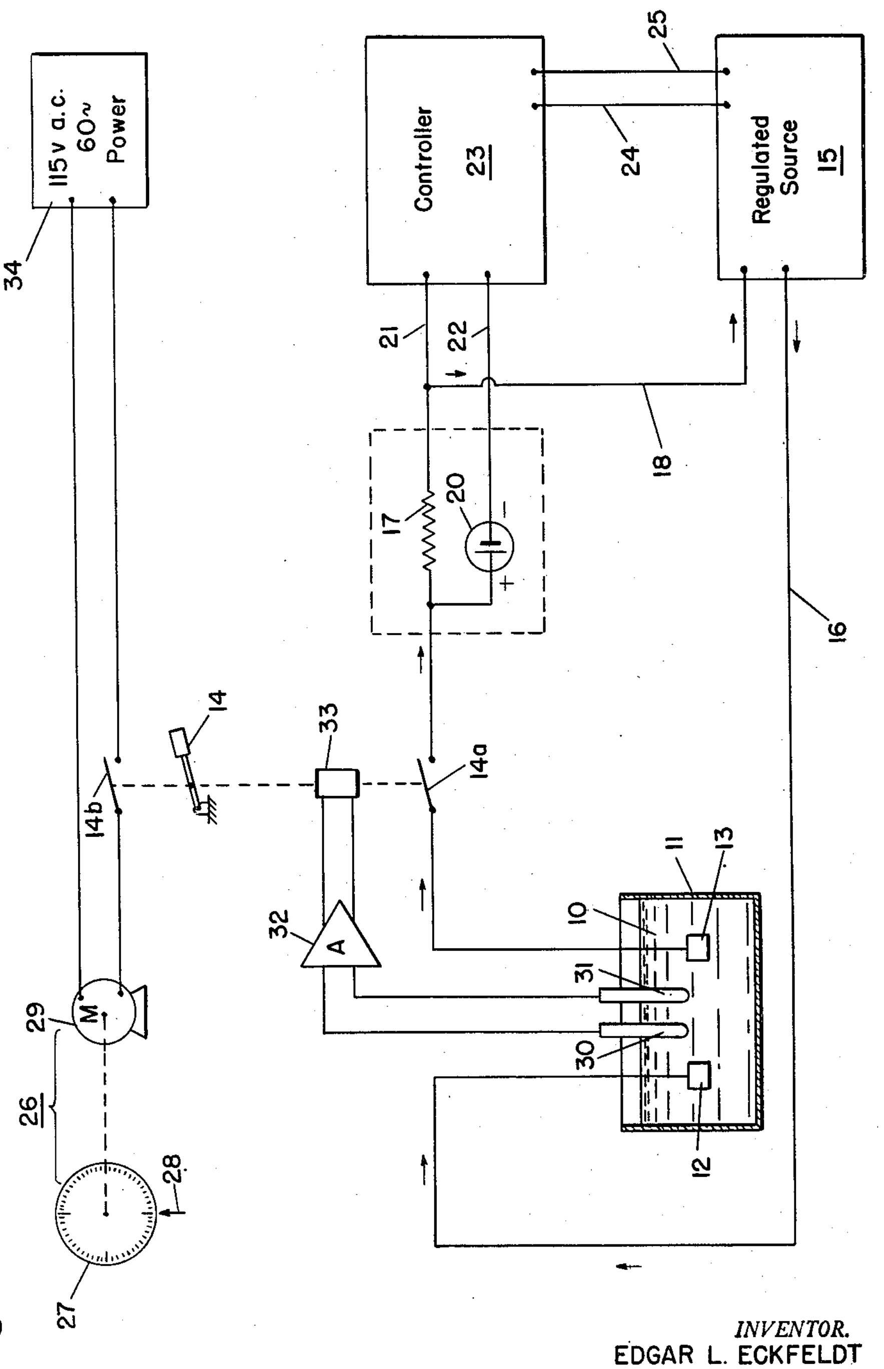

Referring to Fig. 1, the invention has been illustrated as applied to the determination of the amount or the concentration of a constituent in the fluid in a treating zone 10 formed by vessel 11 which has electrodes 12 and 13 extending into the fluid. When the constituent in treating zone 10 is gaseous, it will be present in an electrolyte in the treating zone provided for flow of current from one electrode to the other. The substance or the constituent to be determined in total amount or in terms of concentration may be solid, gaseous or liquid, in solution or otherwise present in the electrolyte. With one or both electrodes suitably selected for the one or more chemical reactions involved, the relationship in the coulometric analysis is as follows:

$$E=\frac{Q}{96{,}500} \qquad (1)$$

where $E$ is the number of chemical equivalents, and
$Q$ is the number of coulombs of electricity.

If, in accordance with the present invention, the magnitude of the current is held constant, the coulombs may be expressed by the product of the current (I) multiplied by the time ($t$). The equation, hence, may be written:

$$E=\frac{It}{96{,}500} \qquad (2)$$

where the current is expressed in amperes and the time in seconds. Since the current is to be held constant notwithstanding variation in the parameters of the coulometric system, the number of chemical equivalents E is always directly proportional to $t$. Accordingly, an indicator which is actuated as a function of time may be calibrated directly in terms of chemical equivalents.

As well understood by those skilled in the art, the number of chemical equivalents E represents an amount of chemical substance. To convert chemical equivalents to other units, such for example as the number of grams of substance ($g$), the chemical equivalents E is multiplied by the equivalent weight of the substance $w$. Accordingly, the following equation is obtained:

$$g=\frac{Itw}{96{,}500} \qquad (3)$$

Thus, the indicator may be calibrated to read either in chemical equivalents E or in grams of the unknown constituent or substance in the treating zone.

In the foregoing it is not necessary to know the volume of the sample fluid in order to measure the amount of the constituent in question. If it is desired to measure on a volume basis the concentration of a constituent concentration in the sample fluid, it will be necessary to predetermine the volume of the sample fluid. Chemical normality (N) expresses constituent concentration and is defined as the number of equivalents (E) per liter (V). Equation 2 can be modified to give:

$$N=\frac{It}{96{,}500 \cdot V} \qquad (4)$$

With both the current and the volume held constant, normality is proportional to time, and the indicating device can be calibrated to read directly normality as an expression of concentration.

The concentration expressed as grams per liter ($c$) is given by the equation:

$$c=\frac{Itw}{96{,}500\ V} \qquad (5)$$

and the indicating device can likewise be calibrated to read directly in grams per liter.

With the foregoing basic theory in mind, it will be seen in Fig. 1 that upon closure as by switch lever 14 of contacts 14a current will flow from a suitably regulated source of current 15 by way of conductor 16, electrodes 12 and 13, contacts 14a, a resistor 17, and by conductor 18 to the regulated source 15. The resistor 17 has a resistance value selected so that when a predetermined current flows through it the potential drop across it will be precisely equal to that of a standard cell 20 connected to one end of the standard resistor in voltage opposition to the potential difference developed across it. If the current in resistor 17 departs from its predetermined value, a difference or error voltage appears and is applied by way of input conductors 21 and 22 to a controller 23 having an output circuit formed by conductors 24 and 25 for regulation of the source 15. By providing the controller 23 with considerable amplification, the slightest deviation of current through the standard resistor 17 will produce adjustment or regulation of the source 15 to prevent change in the magnitude of the current passing between electrodes 12 and 13.

By providing a closely regulated source of current whose magnitude remains constant regardless of variation of parameters of the system as a whole, an indicator 26 including a calibrated dial 27 may be calibrated directly in terms of chemical equivalents or grams of one or more constituents or substances contained in the fluid or liquid in the treating zone 10. With the dial 27, or other equivalent calibrated device, as for example a chart or the like, with reference to an index 28, or a pen, initially set at zero, a timing motor 29 is energized from an alternating current source 34 as by closure of contacts 14b concurrently with closure of contacts 14a. When the concentration of the constituent in the treating zone 10 arrives at an end-point, the contacts 14a and 14b can be opened, as for example by the provision of detecting electrodes 30 and 31, which develop a potential applied to an amplifier 32, which potential when it rises to a predetermined value develops sufficient output from the amplifier 32 to energize the coil 33 for the opening of contacts 14a and 14b.

It is to be understood that if a color indicator be provided in the treating zone 10, an operator upon noting the distinctive color in vessel 11 can manually operate the switch lever 14 to open contacts 14a and 14b. The chemical equivalents or grams of the unknown substance can then be read directly on the calibrated scale or dial 27 of the indicating device 26. It will be further understood that in the absence of the potentiometric detection of the end-point and in the absence of the contacts 14b, a reading may be taken of the indicator 26 at the time of initiation of current flow between electrodes 12 and 13, and a second reading taken when there has been attained an end-point. The difference between the two readings will then be indicative of chemical equivalents or of weight of the unknown constituent depending upon the particular calibration of indicator 26.

As above explained, where a predetermined volume of the solution is contained in the electrolyte in treating zone 10, the scale or indicator 26 may be in terms of concentration of the constituent, such as grams per liter. The scale may also be made in terms of chemical normality N. In other words, the scale may be calibrated to meet the requirements of either of Equations 4 or 5.

When potentiometric detection of the end-point is employed in conjunction with automatic control of the flow of current, the detecting electrode, such as electrode 30 of Fig. 1, will be located with its sensitive end in the immediate vicinity of the electrode which produces the chemical reagent serving to vary the amount of substance or constituent under measurement. By so locating the detecting electrode 30 adjacent say the electrode 12, there is immediate response to change in the amount of substance in the vicinity of electrode 12 which occurs in advance of the change in the substance throughout the treating zone 10. Accordingly, the relay 33 may be operated to interrupt flow of coulometric current in advance of the arrival of the solution as a whole at an end-point. However, as the substance generated at the electrode 12 diffuses through the solution, the amplifier 32 will serve to deenergize relay 33 for closure of contacts 14a and 14b for resumption of current flow until the end-point is established for the solution as a whole. In this manner, the arrival of the solution at the end-point is anticipated and there is avoided change of the substance in the treating zone beyond the end-point which it is desired to establish.

As will be later explained, the current between electrodes 12 and 13 may be maintained substantially constant by different methods of regulation of the value thereof. In accordance with Fig. 2, the difference between the voltage or potential difference developed across resistor 17 and that of standard cell 20 is applied by way of resistors 35 and 36 to the input circuit of an alternating-current amplifier 37. The input circuit of the amplifier 37 includes contacts 38a and 38b of a vibrator 38 whose operating coil is energized from a suitable source of alternating current. When the movable contact engages upper contact 38a the difference or error voltage is applied to the input circuit of amplifier 37. However, when the movable contact engages the lower contact 38b zero input voltage is applied to amplifier 37. Thus, if the voltage of standard cell 20 exceeds the potential difference across resistor 17, there will be a voltage of one polarity applied to contact 38a, and if the potential drop across resistor 17 exceeds the voltage of standard cell 20, the polarity of the error signal at contact 38a will be reversed. A capacitor 39 of around 50 microfarads is connected between resistors 35 and 36, respectively of 150,000 ohms each, and conductor 22 to provide proper phasing in the feed-back circuit to prevent oscillation.

After amplification the output of the amplifier 37 is applied through a transformer 40 to a full-wave rectifier shown in the form of a vibrator 41 supplied from the same source of alternating current supply as the coil of vibrator 38. Where the potential difference across resistor 17 exceeds that of standard cell 20, the rectified output from rectifier 41 increases the negative bias maintained between the grid and cathode of an electronic valve or tube 42. A capacitor 43 and a resistor 44 are provided between grid and cathode of the valve 42. The capacitor 43 maintains the bias on the grid notwithstanding the cyclic operation of vibrator 41, while the resistor 44 provides a discharge path for capacitor 43 so that the grid potential may follow variations in the direct-current output of the full-wave rectifier. As shown, the valve 42 includes a cathode resistor 45, and there is also provided a suitable source of filament supply, though not illustrated.

With the system operating in the manner described, current may flow from any suitable source of direct-current supply as between supply lines 15*a* and 15*b*, the current flow being from line 15*a* by way of the valve 42, resistors 45 and 17, conductor 16, contacts 14*a*, electrodes 12 and 13, and to the other side of the source of direct-current supply, line 15*b*. As in Fig. 1, the contacts 14*b* are closed concurrently with contacts 14*a* to initiate operation of the timing motor 29 for indication on dial 27 relative to the index 28 of the amount or concentration of the constituent in vessel 11.

Figure 2:
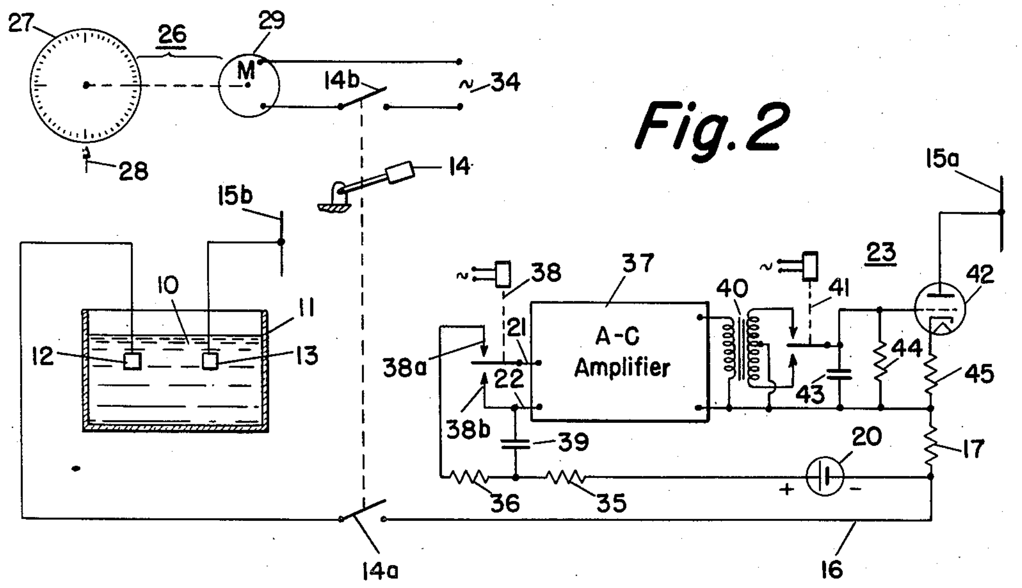
Fig. 2 is similar to Fig. 1 but discloses more in detail essential features of the coulometric current control system.
Figure 3:
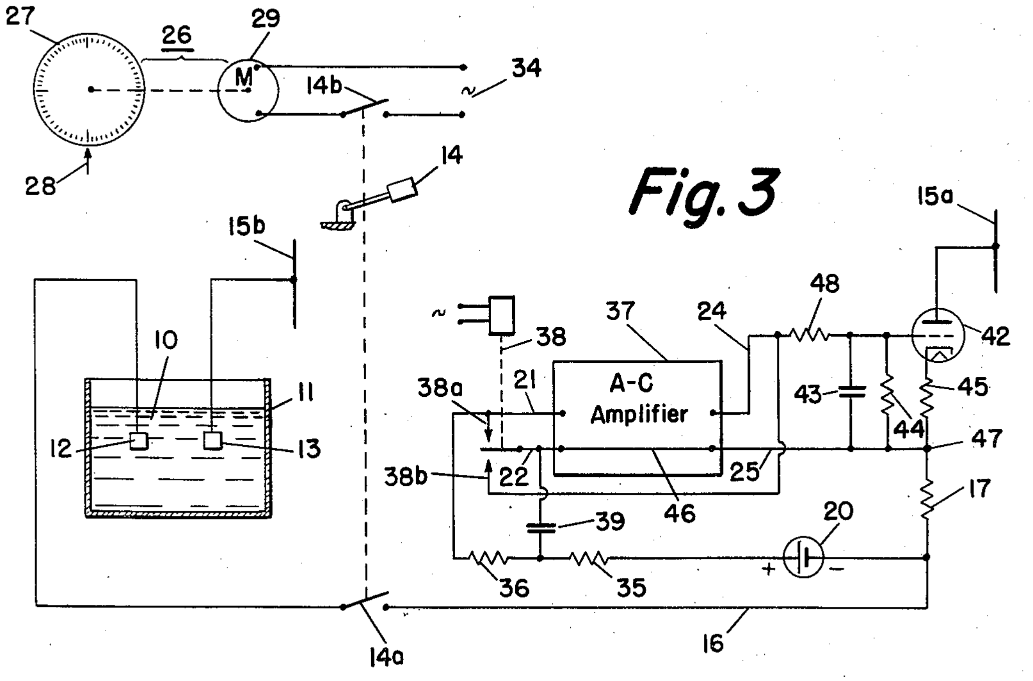
Fig. 3 is similar to Fig. 2 but illustrates a different form of coulometric current control.

In Fig. 3 the system is quite similar to Fig. 2, but differs therefrom in that the vibrator 38 performs the dual function of interrupting or reducing to zero the unidirectional error voltage derived from the potential drop across resistor 17 and standard cell 20 for development of alternating current in the input circuit of the amplifier 37, and also rectifies the alternating-current output of that amplifier. The manner in which the foregoing is accomplished will be understood by noting that the movable contact of vibrator 38, of the polarized type, is connected by conductor 46 to the juncture 47 between resistors 45 and 17. Hence, with the movable vibrator contact in the open position and out of engagement with both of its associated stationary contacts 38*a* and 38*b*, it will be seen that the difference or error voltage is developed across the input terminals of the amplifier 37. It will also be observed that when the movable contact engages the upper contact 38*a*, the input circuit 21—22 to the amplifier is short-circuited, thus removing the error voltage or reducing its value to zero.

Contact 38*b* of vibrator 38 is connected to an output terminal of the amplifier 37. When engaged by the movable contact the output circuit 24—25 of the amplifier is short-circuited. This short-circuiting of the output circuit occurs when half-cycles of one time-phase appear at the output of the amplifier. When half-cycles of opposite time-phase appear, the movable contact is spaced from contact 38*b* and, hence, there is applied to the grid of tube 42 pulses of the same time-phase. Though not essential, a resistor 48 between the amplifier output and the grid of valve 42, and capacitor 43 may be provided. The grid resistor 44 is conventional.

If the voltage of standard cell 20 exceeds the potential drop across resistor 17, pulses of positive polarity will be applied to the grid of tube 42 to increase the current flow through resistor 17 and between electrodes 12 and 13. As the magnitude of the current through resistor 17 rises, the error voltage will decrease in magnitude and so will the amplitude of the pulses applied to the control grid. If the potential difference across resistor 17 rises above that of the voltage of standard cell 20, the polarity of the pulses applied to the grid of tube 42 will reverse and will in its application between the grid and cathode of the tube 42 act to decrease the current flowing through resistor 17 and between electrodes 12 and 13.

With the foregoing description in mind, it will be understood that the pulses applied to the grid-cathode circuit of the tube 42 may be of one polarity or the other though the pulses themselves, with reference to operation of the vibrator 38, appear in the same time sequence.

While the system of Fig. 2 has some advantages over the system of Fig. 3 by reason of the full-wave rectification provided, Fig. 3 is somewhat less expensive and has been found quite satisfactory for commercial coulometric applications.

Figure 4:
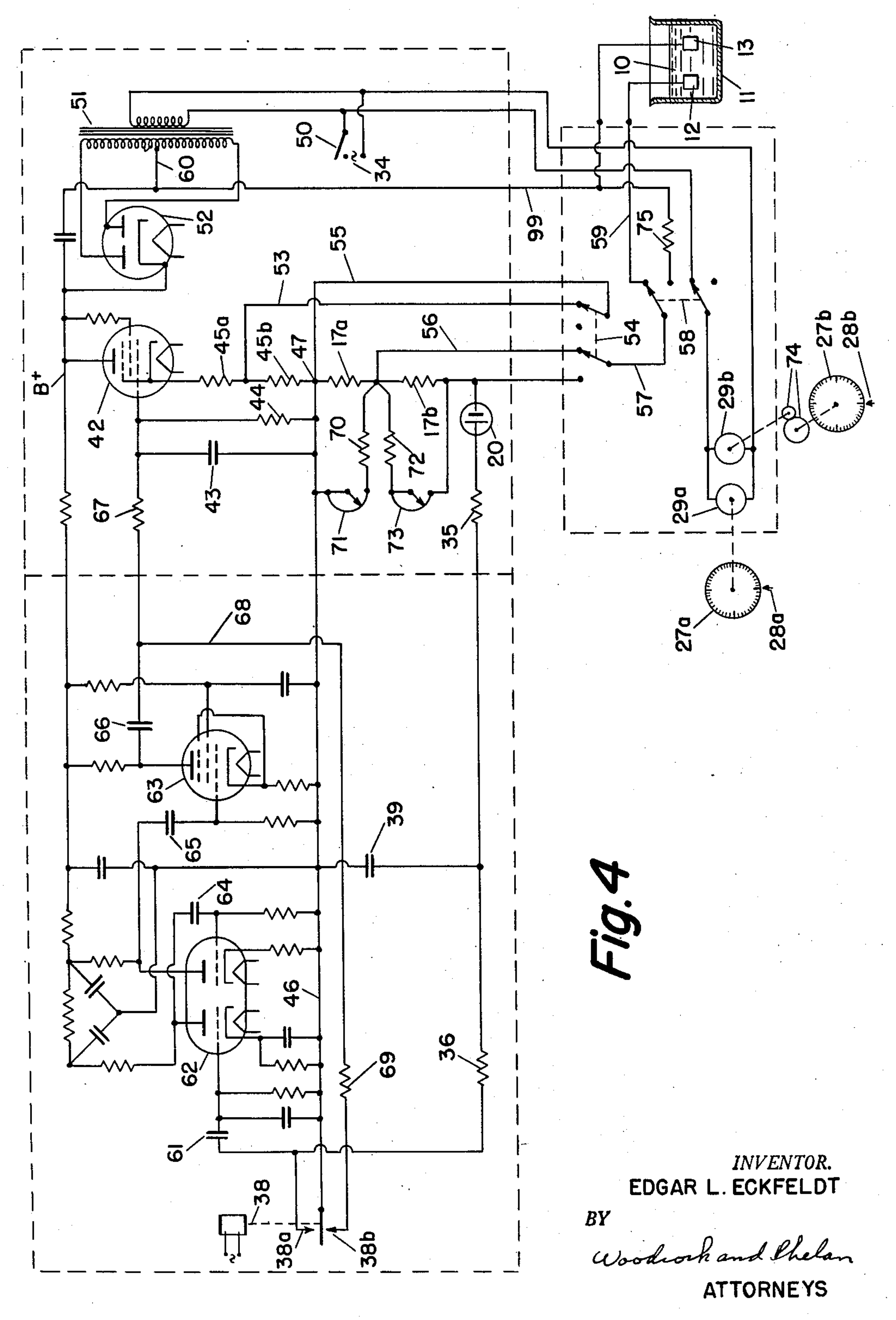
Fig. 4 is a wiring diagram exemplary of a preferred form of the invention.

In Fig. 4 there has been illustrated more in detail the system of Fig. 3, corresponding parts in all modifications being given the same reference characters. The source of supply for the system as a whole may be derived from an alternating-current source indicated at 34. Upon closure of a line switch 50, the primary winding of a transformer 51 will be energized to apply power to a full-wave rectifier shown as a double diode 52. As is well known, the connection of positive polarity is made to the cathode of diode 52. The "B+" line is connected to the plate or anode of tube 42, the circuit to the treating zone or vessel 11 being traceable from B+ through tube 42, a cathode biasing resistor 45*a*, conductor 53, contacts of switch 54, conductor 55, standard resistor 17*a*, conductor 56, contacts of switch 54, conductor 57, a contact of switch 58, conductor 59, through the electrodes 12 and 13 of the treating zone 10, and by conductors 99 and 60 to the center tap of the secondary winding of transformer 51, which in accordance with customary practice corresponds with "B—." Thus it will be recognized that the tube 42 performs the same functions as in the previous modifications.

The potential difference developed across the resistor 17*a* is opposed by the potential of the standard cell 20, and the difference or error voltage is applied by way of resistors 35 and 36 and capacitor 61 to the grid of one side of a double triode tube 62. From an error voltage, the vibrator 38 applies unidirectional pulses to capacitor 61. There is developed in the grid-cathode circuit of tube 62 alternating-current input signals. The vibrator 38 likewise serves to provide half-wave rectification to control the output of the final amplifying stage shown as a pentode or electric valve 63. The rectified output as applied to capacitor 43 and grid resistor 44 controls the bias on the grid-cathode circuit of tube 42. The circuit elements of the amplifier itself are more or less conventional, including the usual voltage-dividing resistors and decoupling capacitors.

The amplified signal from the first half of double triode tube 62 is applied to the second half thereof as by capacitor 64. The amplified output thereof is applied by way of capacitor 65 to the grid of the amplifying tube 63, and the amplified output thereof is applied by way of capacitor 66 and resistor 67 to the control grid of tube 42. A conductor 68 is connected by way of current-limiting resistor 69 to contact 38*b* of vibrator 38 for by-passing or preventing passage to tube 42 of half-waves of one time sequence. It will be observed that conductor 46, as in Fig. 3, extends from the movable contact of vibrator 38 to the juncture 47 and is connected between cathode resistor 45*a* and standard resistor 17*a* by way of conductors 55 and 53.

The resistor 67, if used, may have a value of 100,000 ohms, while the capacitor 43 is preferably small, of the order of .005 mfd. The grid resistor 44 may have a value of a half-megohm, while the cathode resistors 45*a* and 45*b* may be respectively 270 ohms and 3600 ohms.

The cathode resistors 45*a* and 45*b* are selected in accordance with the magnitude of the current to be maintained between electrodes 12 and 13. For example, with tube 42 of the 6L6 type and for a current between electrodes 12 and 13 of the order of 64 milliamperes, the cathode resistor 45*a* may have the value indicated, namely 270 ohms. Such a value for the cathode resistor will establish a negative bias in the cathode grid circuit adequate to maintain the current therethrough at approximately 64 milliamperes with an anode voltage of approximately 350 volts. With the current value predetermined, it will be understood that the standard resistor 17*a* will then be selected for the development of a potential difference equal and opposite to that of standard cell 20. Accordingly, resistor 17*a* may have a value of 15.868 ohms. However, to provide adequate adjustment to take care of variations as between different standard cells, there is provided a resistor 70 of approximately 5600 ohms in series with a variable resistor 71 having a maximum value of 50,000 ohms, both resistors 70 and 71 being connected in series with each other and in parallel with resistor 17*a*.

In order to provide a dual range of current values between the eelctrodes of treating zone 10, a second standard resistor 17*b* of 63.47 ohms is provided, shunted by a resistor 72 of 22,000 ohms and a variable resistor 73 having a maximum value of 200,000 ohms. It will be observed that when the switch 54 is moved from the illustrated position to its left-hand position, the cathode current of tube 42 will then flow through cathode resistors 45*a* and 45*b*, standard resistors 17*a* and 17*b*, instead of through the previously traced circuit which excluded cathode resistor 45*b* and standard resistor 17*b*. By increasing the resistance of the standard resistor (the sum of 17*a* and 17*b*) less current will develop a voltage equal and opposite to the standard cell 20. Hence, with the switch 54 in its left-hand position a lower value of current will be established through the treating zone 10. In practice, and with the circuit parameters specified, the current for the high range was 64.347 milliamperes, while the current for the low range was 12.8695. Regardless of changes of voltage as between one standard cell and a replacement, or with secular changes in voltage and in resistance values, the system as a whole may be readily brought into accurate, calibrated operation with respect to the scale of the indicating means by adjustment of resistors 71 and 73.

Where the current flow in treating zone 10 is to be continued over a substantial period of time, greatly in excess of a single revolution of dial 27*a*, a second calibrated dial 27*b* may be provided, driven either from a synchronous motor 29*b* of much lower speed than synchronous motor 29*a*, or reduction gears 74 may be provided between dial 27*b* and motor 29*b*. With either expedient it is preferred, though not necessary, that dial 27*a* be driven at a speed relative to dial 27*b* such that the distance between adjacent graduations of dial 27*b* represent a known multiple of the values represented by the distance between adjacent graduations of dial 27*a*. Of course dial 27*a* may be arranged to complete one revolution as dial 27*b* is moved from one graduation to the next. In this way the dial 27*b* counts the number of revolutions of dial 27*a*. However, dial 27*b* will be graduated in terms of amount or concentration of the constituent. Thus, by adding the reading of dial 27*b* relative to index 28*b* and the reading of dial 27*a* relative to index 28*a*, the amount or concentration of the constituent in treating zone 10 will be read directly from the two dials.

Except during coulometric analysis, switch 58 is moved to the "off" position, where the movable contacts are in Fig. 4 in their lowermost positions.

When solutions are being changed in the treating zone 10 or new treating vessels 11 substituted for successive determinations, the switch 58 may be in its lowermost "off" position. The lower contact will interrupt the alternating-current circuit leading to motors 29*a* and 29*b*, while the upper contact will connect the cathode circuit of tube 42 from conductor 57 to the conductor 99 leading to the mid-tap 60 of transformer 51. Thus, the circuit of tube 42 will remain closed. If desired, a resistor 75 may be connected between upper contact of switch 58 in the cathode circuit, the resistor having a resistance value of the order of 200 or 300 ohms. It need not be included in the circuit, since the flow of current through the tube 42 will be held constant regardless of the resistance of the load circuit. The tube 62 may be a 12AX7 and the tube 63 a 6AU6, though it is, of course, to be understood that tubes of many differing types may be utilized with conventional circuit components varied to suit the characteristics of the particular tubes used. It is necessary that the control tube 42 have the requisite current-carrying capacity. Any desired current output may be achieved by connecting the needed number of current-regulating tubes in parallel one to the other, with adequate current capacity provided by the source of direct-current supply.

In Fig. 5 the current flow between electrodes 12 and 13 in treating zone 10 is maintained at a substantially constant value by means of a system of different character than those illustrated in Figs. 1–4. From a suitable source of alternating-current supply 34 and by means of a power transformer 51 and full-wave rectifier tube 52, direct current is supplied to lines 76 and 77. A resistor 78 and a capacitor 79 are provided for filter purposes. In the system of Fig. 5 an incandescent lamp 80 is connected in series-circuit relation with the direct-current source of supply. A voltage-regulating tube 81 which may be a VR–150, of the glow discharge type, is connected from line 77 to the juncture 82 between lamp 80 and a resistor 83. The lamp may have a rating of 7 watts, 115 volts, while the resistor 83 may have a value of 1500 ohms. A second glow discharge tube 84 is connected between conductors 77 and 85. This tube may be a VR–105. The glow discharge tubes 81 and 84 provide cascade voltage control as between conductors 77 and 85. The lamp 80 also plays a part in the maintenance of uniform voltage, since it has a tungsten filament whose resistance changes in a direction to oppose change in current flow through it with change of voltage. It will be observed that from the voltage-regulating part of the circuit there is a current path by way of the upper contact of a switch 86, a resistor 87 of 7800 ohms, and a variable resistor 88 whose maximum resistance may be of the order of 2000 ohms. In series with the electrodes 12 and 13 is an additional resistor 89 having a resistance value of 30,600 ohms. Thus, the path including resistors 87 and 88 and the path including resistor 89 have resistance values of a much greater order than the resistance normally to be encountered between electrodes 12 and 13. Stated differently, with resistance values between those electrodes of the order of 200 or 300 ohms maximum, variations, say from 100 to 200 ohms, will result in change in current flow through the circuit of an order which will be relatively unimportant in terms of final results of titration.

To increase the current flow between electrodes 12 and 13, the switch 86 may be operated to its lowermost position to exclude the circuit including resistor 87 and to transfer the circuit from resistor 89 to resistor 90 which may be of the order of 6100 ohms or any other value desired to establish a new range of current flow between electrodes 12 and 13. Preferably the new level of current will be greater than the lower level by the amount which flowed by way of resistor 87. Resistor 88 provides the needed adjustment to meet the foregoing. It will be observed the resistors 89 and 90 are selectively connected in series-circuit relation with a current-indicating device, such as a milliammeter 91. It may be further observed that with switch 86 in either of its two positions, the resistor 88 remains in circuit for adjustment of current level. A switch 92 may be operated from its illustrated position to its uppermost position to connect resistor 93 in circuit with variable resistor 88 in place of the electrodes in treating zone 10. Thus, when electrodes 12 and 13 are disconnected from the current supply circuit, the load resistance of such circuit remains relatively unchanged.

In Fig. 5, the motor 29 is illustrated as energized directly from one-half of the secondary winding of the transformer 51. The motor 29, which may be a synchronous motor of the "Telechron" type, is braked to standstill as the solution in treating zone 10 is brought to an end-point by operating a switch 94 to its upper position to connect through resistors 95 and 96 one side of the direct-current supply through a resistor 97 to the motor windings of motor 29 and thence to the other side of the direct-current source of the supply corresponding with conductor 77. This added feature prevents any coasting of the movable parts including the dial 27 and makes for greater accuracy.

Now that various forms of constant current systems have been fully explained and several different ways of using them have been set forth, it is to be understood that further variations may be made in the invention, all within the scope of the appended claims.

For example, where it is desired to isolate, separate and apart from the zone in which the reagent is generated, the zone where a coulometrically generated agent reacts with the substance to be determined, a system such as illustrated in Fig. 6 may be utilized. As shown, current flows by way of conductor 101 to an electrode **12*a* disposed in the upper part of a vessel 11*a*, through the electrolyte, and by way of electrode 13*a* shown as cylindrical in form within an outlet 11*b* of vessel 11*a*. The current is regulated and maintained to a predetermined value in accordance with the invention as set forth in connection with Figs. 1–5. Any one of such systems may be utilized as the constant current control 100. The material containing the substance whose concentration or quantity is to be determined is introduced into a vessel 102 disposed below the outlet of valve 103 interposed in outlet 11*b*. Upon establishment of current flow between the electrodes as by closure of switch 108, the valve 103 is opened. The reagent produced within vessel 11*a* and particularly at the electrode 13*a* passes into the vessel 102, changing the substance in solution until it attains an end-point. As shown in Fig. 6, that end-point will be determined colorimetrically. At that time the switch 108 will be opened and the amount or concentration read from the dial 27**.

An advantage of the arrangement of Fig. 6 is that only the small batch of liquid contained in vessel 102 need be discarded after analysis. The solution remaining in vessel **11*a*** may be used for successive determinations of concentration or amounts of the substance in successive samples.

While the flow rate through valve 103 is not of great importance because all of the substance formed at electrode **13*a* is swept into vessel 102, nevertheless, a constant flow rate may be readily provided by maintaining a constant head in vessel 11*a* as by the provision of the overflow spout 106 and the supply pipe 104 with valve 105 to regulate the flow of liquid into vessel 11*a* at a rate at least equal to the withdrawal rate by way of valve 103. The electrolyte in vessel 11*a*, by way of example, may be an aqueous solution of potassium iodide where the sample in vessel 102 has a substance which will react with iodine. For example, if the liquid in vessel 102** be arsenious acid, the end-point will be clearly indicated by the presence of excess iodine imparting to an added starch indicator a characteristic color. The amount of iodine formed will be known by the length of time the current—at a predetermined value—flows between the electrodes.

When a relatively small amount of reagent generated at electrode **13*a* is needed to complete a titration or to bring a substance to an end-point in vessel 102, it will be seen that reaction products formed at electrode 12*a* will be effectively separated from those formed at electrode 13*a* and swept into vessel 102**.

When the isolation or divorcement of the reagents produced at electrode **12*a* and at the electrode 13*b* is required over long periods of time, the arrangement of Fig. 7 may be employed. In Fig. 7 a constant-head flow channel 11*f* with electrolyte entering by way of control valve 105 has associated with it two vessels 102*a* and 102*b*. The electrode 12*a* is located in a separate compartment separated from flow channel 11*f* by any suitable material such as parchment paper or unglazed ceramic material as shown at 11*g*. Thus, reaction products formed at electrode 12*a* flow by way of valve 103*a* to vessel 102*a* to react with the unknown substance contained in a liquid therein. Similarly, reaction products formed at electrode 13*a* flow by way of the outlet from the constant-head flow channel 11*f* to the vessel 102*b*** to react with an unknown substance contained in a liquid therein.

Thus, in accordance with Fig. 7 the reagents described in connection with Fig. 6 are not only generated with entire separation of the reaction products at the electrodes **12*a* and 13*a* but either or both of such reaction products may be separately utilized in determinations of unknown amounts or concentrations of substances placed in separate containers 102*a* and 102*b***.

Where it is desired to measure the concentration of a constituent in a flowing stream, Fig. 8, such for example, as in a liquid stream passing through a delivery pipe 110, a slip stream may be withdrawn therefrom as by way of pipe 111 and introduced into a treating vessel 112. This vessel is provided with electrodes 12 and 13 and with potentiometric electrodes 30 and 31. The stream entering vessel 112 is thoroughly mixed by any suitable stirrer, such as the propeller 113. The level of liquid in vessel 112 remains constant, an overflow spout 114 being provided for exit of liquid into the outlet 115. With a fixed or predetermined constant current flow between electrodes 12 and 13 it will be understood at once that an increase in the concentration of the constituent in the slip stream entering vessel 112 will, as far as electrodes 30 and 31 are concerned, indicate that increase. Since the current is constant between electrodes 12 and 13, there is departure from a predetermined value which may be an end-point. Only a predetermined amount of chemical reagent is generated as a result of current flow between the electrodes, and if the concentration of the constituent be increased or decreased, there will not be a change in the amount of reagent generated as a result of the current flow. When such increase occurs, a measuring device of any suitable type, shown as including potentiometer slidewire 116 and battery 117, functions to deflect a galvanometer 118 which may form a part of a mechanical relay of the type shown in Squibb Patent No. 1,935,732 for adjustment of a flow regulator or throttling valve 119 in a direction to change the fluid flow of the constituent in a direction to maintain the concentration of the substance in vessel 112. The setting of pointer **119*a* of flow controller 119 relative to scale 119*b* provides an indication of the concentration of the substance in pipe 110**. Thus with a constant current control, the invention is applicable for the measurement of the concentration of constituents of flowing solutions.

In the several current control systems previously described, further modifications may be made as shown in Figs. 9–11. For example, to the supply lines labeled B+ and B− from the regulated source, there may be connected a reversing switch comprising movable contacts 120 and 121 which in the illustrated positions show flow of current from electrode 12 to electrode 13 of vessel 11. When the contacts 120 and 121 are moved to their right-hand positions current flows from electrode 13 to electrode 12. This arrangement will be found convenient when the chemical reactions within vessel 11 are reversible and the chemical reaction is carried beyond an end-point.

As shown in Fig. 9, two synchronous motors, one for forward rotation and one for reverse rotation, are provided and with a three-position reversing switch in the position shown it will be seen that current flows from the alternating-current source 34 by way of switch contact 122, field coil 123, switch contact 124, and thence to the other side of the source 34. Field coil 125 of the other motor is short-circuited. When the reversing switch contacts are moved to the second position a connection is completed from conductor 126 from the B+ side of the source of the direct current through the field coils 123 and 125 and to the B− side of the source to brake the synchronous motor to standstill. It will be observed that in the second position the contacts 120 and 121 transfer the load circuit of the electrodes from the constant-current source represented by B+ and B− to the resistor 93 as was done in the system of Fig. 5.

When the current is reversed through electrodes 12 and 13, the switch in its third position, the field coil 123 is short-circuited and the coil 125 energized. When the switch is again moved to the "off" position connection is made between conductor 126 leading from B+ through the field coils 123 and 125 and to B−. Thus, the net reading on dial 27 relative to index 28 will be representative of the constituent in the cell 11 notwithstanding an end-point has been attained with flow of current first in one direction and later in the reverse direction.

In Fig. 10 an electrode arrangement is shown for greater versatility. The electrodes 12, 13 and **13*a* are connected in the system of Fig. 9 in accordance with the similarly numbered contacts 131–134** thereof.

The several modifications of the invention may be utilized both in quantitative analysis of a large variety of substances and for the production of solutions including predetermined quantities of electrolytically generated substances such as standard solutions. In my said Patent No. 2,621,671, many examples are set forth including the determination of the amount or quantity of hydrochloric acid in an aqueous solution, the electrodes being respectively silver and platinum. I also disclosed the quantitative analysis of sodium sulphite in solution, sulphuric acid, and I set forth as an example of coulometric analysis where the reactions are reversible in connection with the determination of the basicity of a solution of sodium hydroxide present in the electrolyte in mixture with an excess of sodium sulphate. Though the end-point may be detected potentiometrically, in my said application I disclosed the use of a colorimetric indicator, such as phenolphthalein or methyl orange. Where the amount or quantity of sodium hydroxide is changed beyond an end-point the current may be reversed to bring the quantity of sodium hydroxide in the solution exactly to the end-point. Solutions of predetermined concentration or quantity of substances are disclosed as including iodine and ferrous sulphate. Substances in the gaseous phase may be introduced into the electrolyte, and the amount of selected substances, such as sulphur dioxide, may be determined, one satisfactory electrolyte including sodium iodide buffered with another agent to maintain the pH value of the electrolyte about neutral.

The four-electrode system of Fig. 11 is particularly useful when two successive quantitative determinations are to be made or for reversal of reaction. The electrode **12*a* will be of platinum disposed in a salt bridge or isolated from the electrolyte like or in manner similar to the isolation of electrode 12*a* of Fig. 7. The electrode 13*a* will be silver metal coated with a layer of silver bromide. The electrode 12*b* will be of platinum and isolated chemically from the electrolyte in the same manner as electrode 12*a*, while the electrode 13*b* will be of platinum. If there be in the electrolyte hydrogen ions and silver ions, the quantity or concentrations of both of which are to be determined, on current flow in accordance with Figs. 9 and 11, the silver bromide is converted to metallic silver and bromide ions, the latter going into the solution. Bromide ions react with the silver ions to be determined, causing a precipitate of silver bromide. When an end-point is reached, as determined potentiometrically, the potentiometric electrodes such as 30 and 31 of Fig. 1 disposed in the cell of Fig. 11, the circuit to the electrodes 12*a* and 13*a*** is interrupted. The potentiometric determination of the end-point is preferably made with one potentiometric electrode of metallic silver and the other a conventional type of reference electrode, such as calomel.

With successive coulometric determination of two different substances, such as the hydrogen ions and the silver ions, in the above example, it will be desirable to rearrange the connections of the motor windings 123 and 125 so that with switches 122 and 124 in their first positions, only one motor will be energized, while with the switches in their third positions the other motor will be energized. In that event, each motor will be provided with its own dial and associated indicator from which the quantity of their respective substances would be read directly. The needed modification of the circuit is elementary and, hence, need not be illustrated.

To determine the concentration of the hydrogen ions the switch of Fig. 9 will then be operated to its third position for flow of current between electrodes **12*b* and 13*b*. The hydrogen ions will be discharged as hydrogen gas at the platinum electrode 13*b***, thus changing the quantity or concentration of hydrogen ions in the electrolyte. When an end-point is reached as determined by potentiometric electrodes, one including a pH responsive electrode preferably of the type including a thin glass membrane, and the other the calomel reference electrode, the switch is again returned to its mid-position or second position interrupting the current flow.

It will be observed that since electrodes **12*a* and 12*b* are identical, a three-electrode system, such as in Fig. 10, may be substituted for the four-electrode system of Fig. 11 with the switching circuit a relatively simple one in which the current flow from the positive side of the source is always connected to point 131 and the negative supply line is first connected to electrode 13*a* and then to electrode 13. In the foregoing, electrode 12 would be identical with electrodes 12*a* and 12*b* of Fig. 11, electrode 13*a* of Fig. 10 corresponding with electrode 13*a* of Fig. 11, and electrode 13 of Fig. 10 corresponding with electrode 13*b* of Fig. 11. Of course, the switching arrangement of Fig. 9 may be applied to Fig. 10 for the above analysis in the following manner: the isolated platinum electrode 12 will be connected to contacts 131 and 132 of Fig. 9, the electrode 13 of silver, silver bromide will be connected to contact 133, and the platinum electrode 13*a* will be connected to contact 134**.

The electrode arrangement of Fig. 11 is particularly advantageous for determination of the chloride ion in the electrolyte (for the quantitative analysis of sodium chloride and other alkali metal chlorides, and the like). In the reduction of the quantity of chloride ion in the electrolyte current will flow from a silver anode **12*a* to a platinum cathode 13*a*. Should the titration exceed an end-point, upon operation of the switch of Fig. 9 to its third position current will flow from a platinum anode 12*b* to a silver, silver chloride cathode 13*b*. Accordingly, excess silver ions resulting from carrying the reaction beyond an end-point will be removed from solution by the release of chloride from the silver, silver chloride electrode 13*b*, the chloride uniting with the excess silver ions to remove them from the solution. The three-electrode system of Fig. 10 is not preferred for this reaction for the reason that silver may, and likely will be, deposited on the platinum cathode 13*a*, and even though in small amounts, would interfere with the reverse operation where the platinum electrode 12*b*** is made the anode instead of the cathode.

In the modifications of Figs. 6 and 7, it will be recalled that the manner in which the reaction products at one of the current electrodes could be isolated from the other current electrode was explained. Fig. 12 illustrates another modification along the same lines in which alternating current applied to lines 200 and 201 is converted to direct current by a rectifier 202 and is applied to the current electrodes 203 and 204, the circuit including a suitable meter 205. The electrode 204 is mounted in an elongated neck 207 of a vessel 206 having an inlet 208 for the solution having the substance whose quantity is to be determined, and also an inlet 210 for an auxiliary solution, when needed. Inlet line 208 is provided with a throttling valve 209 and similarly a throttling valve 211 is provided for line 210, the valves being for the purpose of providing regulation of the rates of flow into the vessel 206. With current passing between electrodes 203 and 204 and with liquid introduced through one or both of inlet pipes 208 and 210, it will be observed that reaction products formed at the electrode 204 are swept into an outlet 212 of vessel 206 and into a drain pipe 213. Thus, only the substances generated at the electrode 203 or the chemical reactions produced by current flow through the electrolyte in association with electrode 203 are effective to change the amount of substance in solution in the electrolyte in vessel 206. A stirrer 113 is driven by any suitable means, such as a motor 113a.

Where it is desired to utilize the features set forth in connection with Fig. 6 in a continuously flowing system, the arrangement of Fig. 13 may be utilized. It will be observed the current electrode 203 is located in a vessel 220 disposed above the vessel 206 with an inlet pipe 221 extending between vessels 206 and 220. The other current electrode 204 is disposed in the outlet pipe 207. Thus, with current flow between electrodes 203 and 204 the reaction products at electrode 204 are swept into outlet 212 while the reaction products produced in vessel 220 pass through throttling valve 224 into vessel 206. It will be understood that the throttling valve 224 may be replaced with a capillary tube and in any event, the valve 224 will be arranged so that there will always be a liquid current path through it for flow of current between electrodes 203 and 204. While the electrode 203 is shown above valve 204 where a capillary tube is used, in other cases the electrode 203 may be located near the lower end of tube 221 for discharge of reaction products into the vessel 206.

In certain forms of reactions, instead of maintaining the current constant it is desirable that a predetermined potential be maintained between the electrolyte and a current electrode or with respect to a potentiometric electrode.

Such a system has been shown in Fig. 14 where the potentiometric electrode 250 is shown disposed within any suitable form of the reaction vessel 255 and connected by conductor 252 to the input circuit of an amplifier and control device 253. A reference electrode 251 disposed in cell 255 is also connected in said input circuit. The voltage developed between electrodes 250 and 251 is opposed by the potential difference developed between conductors 256 and 257 developed from a potentiometric network 258. When the potential difference between conductors 256 and 257 differs from that between potentiometric electrodes 250 and 251 there is applied through vibrator 260 an input signal which results in the energization of a motor 261 for rotation in one direction or the other depending upon the polarity of the applied signal. The motor 261 is arranged to adjust the voltage output of a variable transformer shown in the form of an auto-transformer 263. The voltage output from the variable transformer 263 is applied by way of a transformer 264 to a rectifier 267, the output of which after filtering as by filter 268 is applied to current electrodes 271 and 272. Current-responsive meter 273 is preferably included in circuit with the electrodes, and the inclusion of a resistor 274 in shunt across the filter 268 has been found to improve the time-response characteristics of the system. The resistor 274 is particularly useful when a three-electrode system is utilized, in which case one of the current electrodes 271 or 272 would be utilized also as a potentiometric electrode, in which case the conductor 252 is connected directly to the selected current electrode and the potentiometric electrode 250 omitted.

With the system operating as described, the slidewire 258a is set at a predetermined value to establish a potential difference between conductors 256 and 257 of desired magnitude. Accordingly, the current flow through current electrodes 271 and 272 will be adjusted until the potential between electrodes 250 and 251 is equal and opposite to the potential difference between the aforesaid conductors. Upon variation of the difference, which will be the signal applied to the amplifier 253, the motor 261 will be operated in one direction when the potential between electrodes 250 and 251 exceeds that between conductors 256 and 257, and vice versa. The amplifier 253 may be of the type disclosed in Williams Patent 2,113,164, or it may be of other types well known to those skilled in the art.

Where an amplifier is utilized, particularly when the current electrodes 271 and 272 are supplied from a separate source such as the source of alternating current supply indicated by supply lines 275 and 276, it is desirable that ample time be provided for the amplifier to function prior to application of power to the current electrodes. This can be done in several ways known to those skilled in the art, one of which has been diagrammatically illustrated. Specifically, after closure of a switch 277 in the supply lines for amplifier 253, a relay 278 is energized which, after a predetermined time interval established by a dashpot 279, closes its contacts 278a to complete the circuit for the voltage-determining transformer 263. The time interval will be adequate to insure that all components of the amplifier, such as indirectly heated cathodes, are up to temperature and full control over motor 261 established.

If desired, and in general, it will be preferred to have the time interval established by dashpot 279 adequately long also to insure operation by motor 261 of the contact 262 to its zero-voltage position. This can be conveniently done by providing normally closed contacts 290 for completing an energizing circuit including bias battery 291 and a resistor 292 across the input circuit of amplifier 253 for application thereto of a predominating signal of polarity which assures rotation of motor 261 to drive contact 262 to its zero-voltage position. Thus, upon operation of relay 278 the biasing circuit will be disconnected from the amplifier 253 and automatic control will be established to move contact 262 from its zero-voltage position to the position required by the setting of the contact of slidewire 258a and the potential developed between electrodes 250 and 251. The transformer 264 provides different potential levels between electrodes 271 and 272 and is particularly useful where the resistance between the electrodes for one electrolyte may differ greatly from that of a different electrolyte. By moving a contact 264a from one voltage tap to another, any desired potential may be maintained. Two taps are illustrated in the drawing, but it is to be understood that as many taps as desired may be provided.

It will be further observed that the system of Fig. 14 provides between electrodes 271 and 272 current of any desired magnitude, the system not having any limitations as regards the amount of current which may be caused to flow between the electrodes. The quality of electricity flowing during a given coulometric run may be readily measured by making meter 273 a coulometer.

It will be further observed the system of Fig. 14 may be utilized in connection with the electrode arrangements of Figs. 9–13 and also that the modifications of Figs. 12 and 13 may be utilized with any of the various control systems herein disclosed and other modifications may be made within the scope of the appended claims.

Certain features of the present case have been disclosed in my copending application, Serial No. 152,734, filed March 29, 1950, now Patent 2,758,079, but claims to such features and to features claimed in my divisional application, Serial No. 572,763, filed March 20, 1956, have not been presented in this application.

What is claimed is:

1. A coulometric system for determining the concentration of a constituent in an electrolyte comprising a pair of electrodes, a vessel containing the electrolyte and said constituent, said electrolyte forming a conducting path between said electrodes, a supply circuit including a resistor, a current regulator and said electrodes connected to an unregulated source of unidirectional current, current flow by way of said regulator and said resistor and between said electrodes producing in said electrolyte chemical reactions for varying the quantity of said constituent in said electrolyte, an amplifier having an input circuit including said resistor, a standard cell in said input circuit connected to oppose in said input circuit the potential difference developed across said resistor due to said current flow therethrough, a vibrator included in said input circuit for producing at the output of said amplifier an alternating current of amplitude proportional to the difference between the voltage of said standard cell and the potential difference developed across said resistor and of one phase when said voltage is greater and of the opposite phase when said voltage is less than said potential difference, and means responsive to the output of said amplifier for operating said regulator in accordance with the phase and amplitude of said alternating current to maintain said current flow between said electrodes at a magnitude which maintains said potential difference developed across said resistor equal to the voltage of said standard cell.

2. The combination set forth in claim 1 in which there is provided indicating means calibrated in terms of the quantity of said constituent, circuit-controlling means in series with said electrodes in said supply circuit for initiating flow of said current between said electrodes, means for initiating operation of said indicating means concurrently with initiation of said current flow between said electrodes whereby said indicating means indicates quantity of said constituent when the quantity thereof in the solution is brought to a predetermined end-point by said current flow between said electrodes.

3. The combination set forth in claim 2 in which said indicating means comprises two indicators, one having a graduated scale in terms of quantity of said constituent in solution and operable at relatively high speed, and the second indicator being operable from one graduation to another during a predetermined rotation of said first-named indicator.

4. The combination set forth in claim 1 in which circuits are provided to different portions of said resistor, means for changing the flow of current to said electrodes from one of said circuits to another to increase the resistance of said resistor for development of a potential difference equal and opposite to said standard cell upon current flow of a lower order of magnitude.

5. The combination set forth in claim 4 in which an indicator is provided for each level of current flow to said electrodes established by said circuits to different portions of said resistor.

6. The combination set forth in claim 4 in which said current regulator comprises an electric valve having an anode and cathode for flow of said current to said electrodes and having a control grid for varying the magnitude thereof, a cathode-biasing resistor, a circuit for short-circuiting a part of said cathode resistor, and means operable concurrently with change in said connections to said first-named resistor for changing said short-circuit connections to add additional biasing resistance into said cathode circuit.

7. A coulometric system comprising a source of direct current, a regulator for said current source operable in one direction or the other for increase and decrease of its resistance to current flow, a circuit including said source and said regulator, means for opening and closing said circuit, said regulator including a standard cell, a resistor connected in circuit with said source and with said standard cell for development of a potential difference of polarity opposing that of said standard cell, an alternating current amplifier, a converter connected to the input of said amplifier and responsive to said potential difference for applying to said amplifier an alternating current signal whose amplitude is proportional to the magnitude of difference between the voltage of said cell and said potential difference across said resistor and whose phase is determined by the direction of said difference, means connecting the output of said amplifier to said regulator for selective operation of said regulator in said one direction or the other to maintain said current flow at a magnitude which maintains said potential difference equal to the voltage of said standard cell, and means operable concurrently with closure of said circuit for initiation of current flow through said circuit for measuring the time interval of current flow in said circuit.

8. A coulometric system comprising a pair of current electrodes, a vessel containing electrolyte and forming a conducting path between said electrodes, said electrolyte containing at least one substance whose concentration upon flow of current at a constant value through said electrolyte is varied as a function of the product of the current and the time of flow of said current through said electrolyte, means including a current regulator connected with said electrodes for producing said current flow between said electrodes through said electrolyte at said constant value, potentiometric electrodes disposed within said electrolyte for producing a potential difference of magnitude related to the concentration of said constituent in the electrolyte, timing means for measuring the time-interval of current flow between said electrodes, means in circuit with said electrodes for initiating said current flow at said constant value between said current electrodes and for simultaneously initiating operation of said timing means, and means responsive to a predetermined potential difference developed by said potentiometric electrodes for bringing to standstill said timing means whereby the said time-interval is related to the concentration of the constituent in said electrolyte.

9. The coulometric system of claim 8 in which said means connected to said electrodes for producing said current flow at said constant value includes a resistor in series with said current electrodes for developing a potential difference proportional to current flow therethrough, a comparison circuit including said resistor and a standard cell, and means for maintaining said current flow through said resistor at a constant value and of magnitude for producing a potential difference across said resistor which bears a predetermined relation to the potential difference of said standard cell.

10. The coulometric system of claim 8 in which said timing means is calibrated in terms of concentration of said constituent in said electrolyte and in which said timing means provides a reading of the concentration of said constituent in said electrolyte when said constituent in said electrolyte has been brought to an end point.

11. The coulometric system of claim 8 in which relay means is provided to interrupt operation of said timing means, an amplifier for energizing said relay means, and means for applying to the input of said amplifier the potential difference developed by said potentiometric electrodes.

12. The coulometric system of claim 8 in which relay means is provided to interrupt both operation of said timing means and said current flow between said current electrodes, an amplifier for energizing said relay means, and means for applying to the input of said amplifier the potential difference developed by said potentiometric electrodes.

13. A coulometric system for determining the concentration of a constituent in an electrolyte comprising a pair of electrodes, a vessel containing the electrolyte and said constituent, said electrolyte forming a conducting path between said electrodes, a supply circuit including a resistor, a current regulator and said electrodes connected to a source of unidirectional current, current flow by way of said regulator and said resistor and between said electrodes producing in said electrolyte chemical reactions for varying the quantity of said constituent in said electrolyte, an amplifier having an input circuit including said resistor, a standard cell in said input circuit connected to oppose in said input circuit the potential difference developed across said resistor due to said current flow therethrough, a vibrator having a movable contact operable between a pair of stationary contacts, one of said stationary contacts and said movable contact being connected across said input circuit for producing at the output of said amplifier an alternating current of amplitude proportional to the difference between the voltage of said standard cell and the potential difference developed across said resistor, means including said movable contact and the other of said stationary contacts for short-circuiting the amplifier output upon appearance therein of halfwaves of one time phase of said alternating current, and means operable by amplitude changes of the halfwaves of opposite time phase of said alternating current for operating said regulator to maintain the current flowing between said electrodes at a value which maintains the voltage developed across said resistor equal to that of said standard cell.

14. In a system for determining the concentration of a constituent in an electrolyte, the combination of a vessel having a treating zone for containing a quantity of electrolyte, flow-passages extending away from said vessel for flow of electrolyte through a first of them away from said zone and through a second of them into said zone, a first electrode disposed in the electrolyte within said first passage in a position outwardly spaced from said zone, a second electrode within electrolyte in a position spaced from said first passage for varying the concentration of said constituent in said electrolyte in said treating zone upon flow of current between said electrodes, means for producing current flow through the electrolyte between said electrodes to bring to a predetermined value the concentration of said constituent in said electrolyte in said treating zone, means for supplying electrolyte to said zone during passage of said current between said electrodes for producing a moving stream of electrolyte outwardly of said first flow-passage, said outwardly flowing stream carrying with it any reaction product formed at said first electrode to prevent contamination by such reaction product of the electrolyte within said treating zone, and measuring means responsive to the concentration of said constituent in said treating zone for indicating when said constituent has been brought to said predetermined value by flow of said current between said electrodes.

15. The system of claim 14 in which said second passage is the inlet passage for flow of electrolyte into said vessel, and in which said second electrode is disposed wholly within said treating zone in a region intermediate said flow passages.

16. The system of claim 14 in which said second passage is an inlet passage for flow of electrolyte into said vessel, and in which said second electrode is disposed wholly within said inlet passage, said treating zone being disposed between said passages.

References Cited in the file of this patent

UNITED STATES PATENTS

| | | |
|---|---|---|
| 898,390 | Pauling | Sept. 8, 1908 |
| 2,551,407 | Alder | May 1, 1951 |
| 2,576,056 | Wannamaker | Nov. 20, 1951 |
| 2,584,816 | Sands | Feb. 5, 1952 |
| 2,621,671 | Eckfeldt | Dec. 16, 1952 |

OTHER REFERENCES

"Experimental Electrochemistry," by Hopkins (1905), page 89.

"Chemical Abstracts," vol. 43 (1949), pages 959 and 960, abstract of two articles by Trishin.